United States Patent
Thomas

(10) Patent No.: US 11,050,650 B1
(45) Date of Patent: Jun. 29, 2021

(54) PREVENTING TRAFFIC OUTAGES DURING ADDRESS RESOLUTION PROTOCOL (ARP) STORMS

(71) Applicant: Juniper Networks, Inc, Sunnyvale, CA (US)

(72) Inventor: Shijo Thomas, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/421,032

(22) Filed: May 23, 2019

(51) Int. Cl.
*H04L 12/26* (2006.01)
*H04L 29/12* (2006.01)
*H04L 29/06* (2006.01)

(52) U.S. Cl.
CPC ........ *H04L 43/0894* (2013.01); *H04L 61/103* (2013.01); *H04L 61/2553* (2013.01); *H04L 61/6022* (2013.01); *H04L 63/0236* (2013.01)

(58) Field of Classification Search
CPC ............. H04L 43/0894; H04L 61/6022; H04L 63/0236; H04L 61/103; H04L 61/2553
See application file for complete search history.

(56) References Cited

U.S. PATENT DOCUMENTS

| | | | | |
|---|---|---|---|---|
| 7,434,254 B1* | 10/2008 | Foschiano | ............. | H04L 61/103 713/153 |
| 8,250,647 B2* | 8/2012 | Foschiano | ............. | H04L 61/103 726/13 |
| 8,780,811 B1* | 7/2014 | Datta | ................... | H04L 61/2592 370/328 |
| 2002/0073338 A1* | 6/2002 | Burrows | ............. | H04L 41/0213 726/13 |
| 2003/0043853 A1* | 3/2003 | Doyle | ..................... | H04L 61/10 370/489 |
| 2004/0215976 A1* | 10/2004 | Jain | ...................... | H04L 63/1458 726/23 |
| 2005/0198242 A1* | 9/2005 | Kim | ..................... | H04L 61/2046 709/223 |
| 2006/0288411 A1* | 12/2006 | Garg | ................... | H04L 63/0236 726/22 |
| 2008/0062916 A1* | 3/2008 | Mosko | .................... | H04L 45/20 370/328 |
| 2010/0165878 A1* | 7/2010 | Soni | ..................... | H04L 63/1441 370/254 |

(Continued)

OTHER PUBLICATIONS

Rahman et al., "A Holistic Approach to ARP Poisoning and Countermeasures by Using Practical Examples and Paradigm", Mar. 2014, International Journal of Advancements in Technology, vol. 5 No. 2, p. 82 (Year: 2014).*

*Primary Examiner* — Ramy M Osman
(74) *Attorney, Agent, or Firm* — Harrity & Harrity, LLP

(57) ABSTRACT

A device may determine internet protocol (IP) traffic monitoring criteria and may monitor IP traffic based on the IP traffic monitoring criteria. The device may update, based on monitoring the IP traffic, a table of currently active IP traffic flows and may update, based on the table of currently active IP traffic flows, an address resolution protocol (ARP) packet filter. The device may receive one or more ARP packets from a different device and may determine whether to accept or discard the one or more ARP packets based on the ARP packet filter. The device may update an ARP table based on determining to accept the one or more ARP packets.

20 Claims, 13 Drawing Sheets

(56) References Cited

U.S. PATENT DOCUMENTS

| | | | |
|---|---|---|---|
| 2011/0113482 A1* | 5/2011 | Foschiano | H04L 63/1441 726/13 |
| 2015/0249666 A1* | 9/2015 | Kato | H04L 63/1458 726/7 |
| 2015/0372968 A1* | 12/2015 | Tonzetic | H04L 61/103 709/245 |
| 2016/0072929 A1* | 3/2016 | Alsup | H04L 47/245 370/392 |
| 2017/0237769 A1* | 8/2017 | Ookawa | H04L 63/0236 726/22 |

* cited by examiner

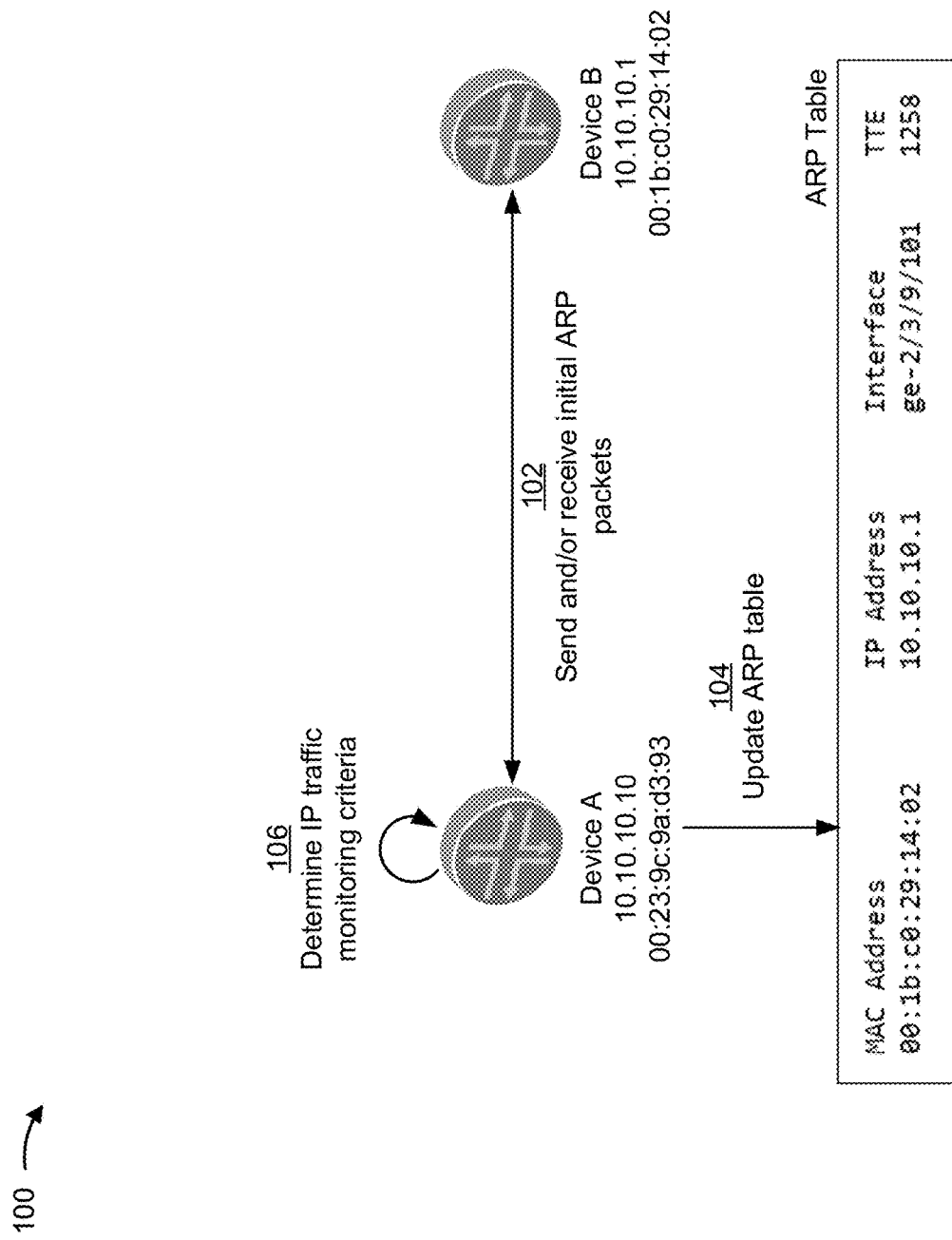

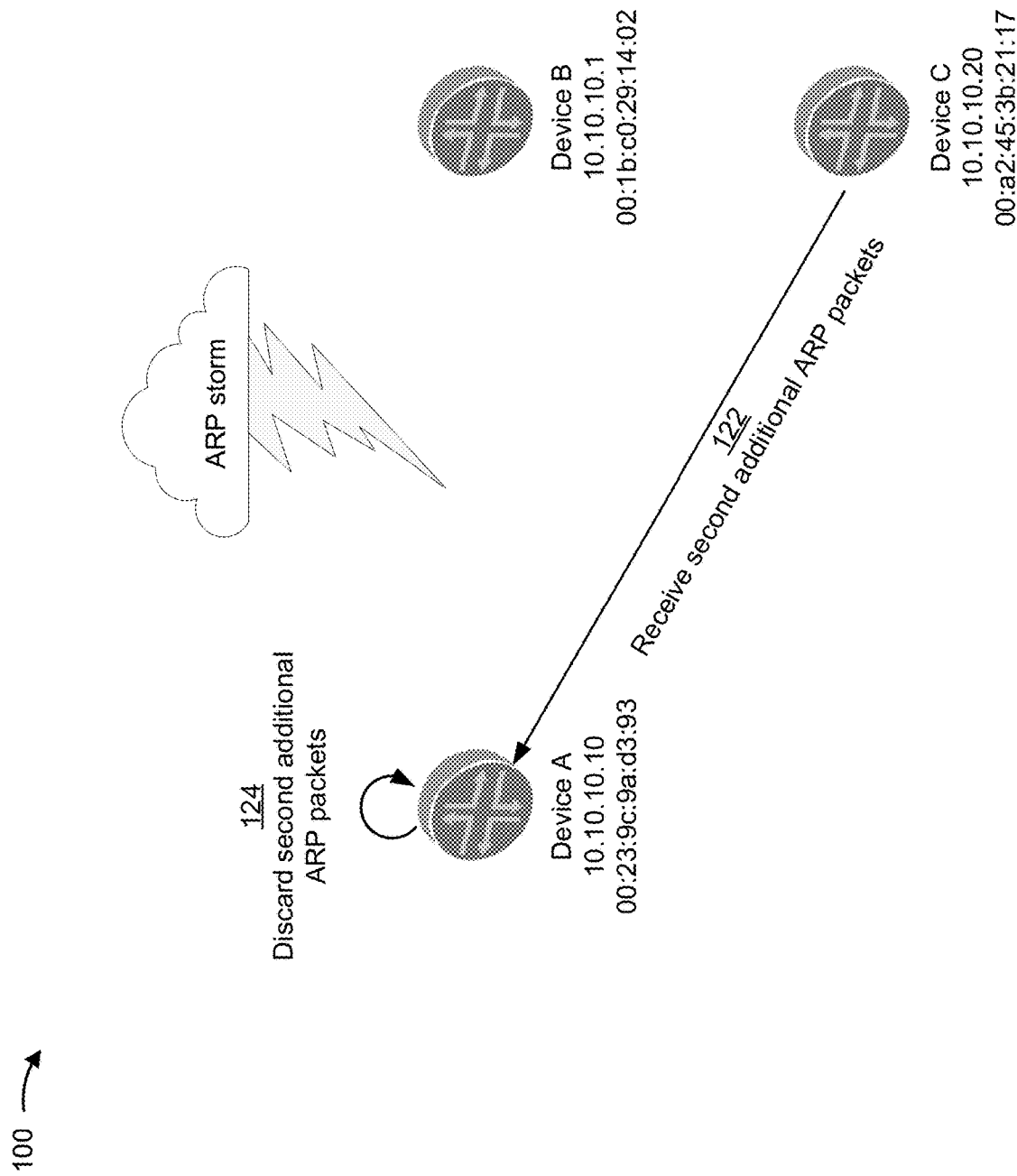

PREVENTING TRAFFIC OUTAGES DURING ADDRESS RESOLUTION PROTOCOL (ARP) STORMS

BACKGROUND

Address Resolution Protocol (ARP) is a computer networking protocol for determining a network device's Layer 2 or hardware address when only the device's Internet Layer or Layer 3 address is known. A device may maintain an ARP table to determine an internet protocol (IP) Address or a media access control (MAC) address of another device in a network.

SUMMARY

According to some implementations, a method may include determining, by a device, internet protocol (IP) traffic monitoring criteria; monitoring, by the device, IP traffic based on the IP traffic monitoring criteria; updating, by the device and based on monitoring the IP traffic, a table of currently active IP traffic flows; updating, by the device and based on the table of currently active IP traffic flows, an address resolution protocol (ARP) packet filter; receiving, by the device, one or more ARP packets from a different device; determining, by the device, whether to accept or discard the one or more ARP packets based on the ARP packet filter; and updating, by the device, an ARP table based on determining to accept the one or more ARP packets.

According to some implementations, a device may include one or more memories; and one or more processors, communicatively coupled to the one or more memories, configured to: determine internet protocol (IP) traffic monitoring criteria; monitor IP traffic routed through the device based on the IP traffic monitoring criteria; update, based on monitoring the IP traffic, a table of currently active IP traffic flows; update, based on the table of currently active IP traffic flows, an address resolution protocol (ARP) packet filter; receive one or more ARP packets from a different device; discard the one or more ARP packets based on the ARP packet filter; determine, after discarding the one or more ARP packets, that an item associated with the different device in an ARP table has expired; send an IP keepalive request message to the different device; receive an IP keepalive response message from the different device; and update the ARP table based on the IP keepalive response message.

According to some implementations, a non-transitory computer-readable medium may store one or more instructions. The one or more instructions, when executed by one or more processors of a device, may cause the one or more processors to: receive one or more initial address resolution protocol (ARP) packets from one or more additional devices; update an ARP table based on the one or more initial ARP packets; determine internet protocol (IP) traffic monitoring criteria; monitor IP traffic based on the IP traffic monitoring criteria; update, based on monitoring the IP traffic, a table of currently active IP traffic flows; update, based on the table of currently active IP traffic flows, an ARP packet filter; receive one or more ARP packets from a different device; determine whether to accept or discard the one or more ARP packets based on the ARP packet filter; and cause the ARP table to be updated based on determining whether to accept or discard the one or more ARP packets.

BRIEF DESCRIPTION OF THE DRAWINGS

FIGS. 1A-1G are diagrams of example implementations described herein.

DETAILED DESCRIPTION

Figure 1B:
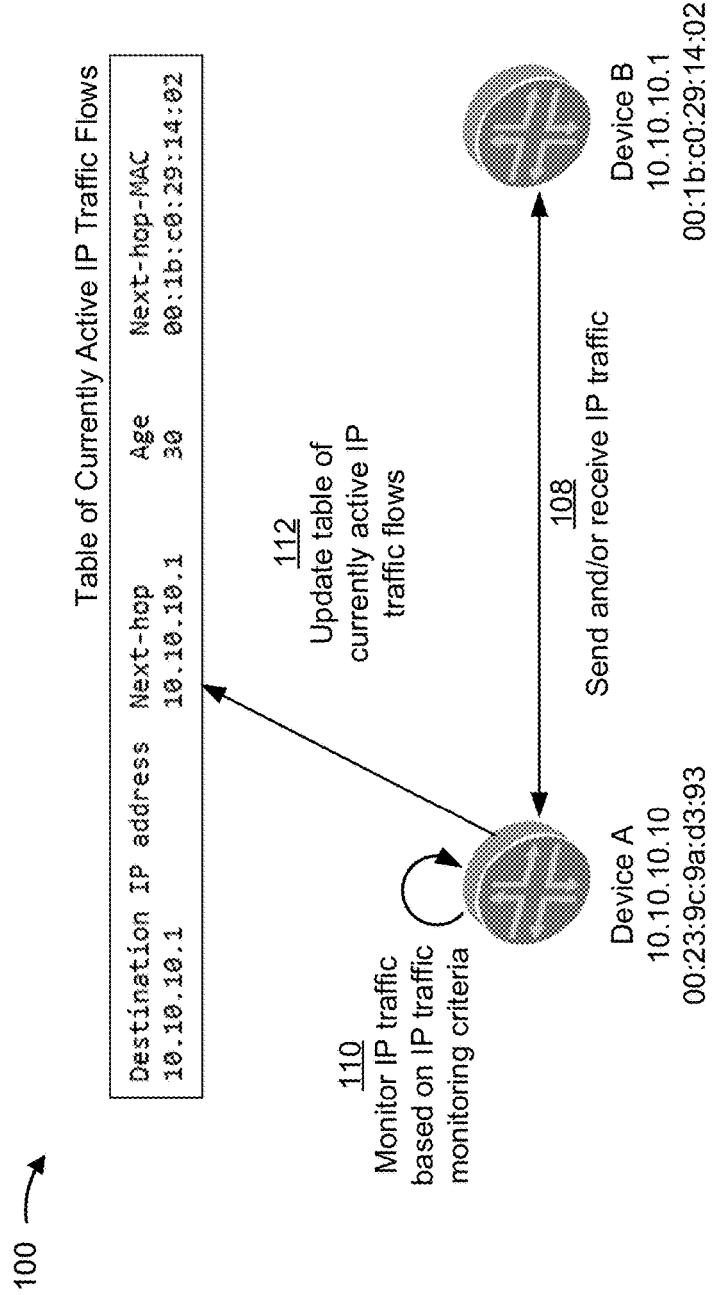

The following detailed description of example implementations refers to the accompanying drawings. The same reference numbers in different drawings may identify the same or similar elements.

A device may use an Address Resolution Protocol (ARP) table to resolve a media access control (MAC) address of an additional device before sending IP traffic to the additional device. In some instances, a device may send and receive ARP packets to and from multiple devices to maintain the ARP table and to ensure that entries in the ARP table are up-to-date. In some cases, an entry in the ARP table may expire if the device does not receive an ARP packet associated with the entry within a particular time period. Accordingly, the device may automatically remove the entry from the ARP table. This ensures that the ARP table has up-to-date information.

However, any IP traffic related to the entry will be dropped by the device until the device receives an ARP packet to add the entry back to the ARP table. This can be problematic during an ARP storm, wherein the device receives more ARP packets during a period of time than it can process during the period of time. In some cases, the device may include an ARP packet filter (also referred to as an ARP policer) that discards excess ARP packets that are received by the device during an ARP storm. This can result in ARP packets from particular devices not being received and processed by the device, which can result in entries in the ARP table that are associated with the particular devices not being updated, which can result in the entries being removed from the ARP table, which can result in IP traffic from the particular devices being unnecessarily dropped by the device. In some cases, the device cannot communicate IP traffic with the particular devices until the ARP storm subsides and the device can receive ARP packets from the particular devices again. This can result in critical network outages.

Some implementations described herein provide a device that is capable of maintaining an ARP table during an ARP storm. In some implementations, the device may determine internet protocol (IP) traffic monitoring criteria and may monitor IP traffic based on the IP traffic monitoring criteria. The device may update, based on monitoring the IP traffic, a table of currently active IP traffic flows and may update, based on the table of currently active IP traffic flows, an address resolution protocol (ARP) packet filter. The device may receive one or more ARP packets from a different device and may determine whether to accept or discard the one or more ARP packets based on the ARP packet filter. The device may update an ARP table based on determining to accept the one or more ARP packets. Additionally, or alternatively, in some implementations, the device may send an IP keepalive request message to the different device and may receive an IP keepalive response message from the different device. In some implementations, the device may update the ARP table based on the IP keepalive response message.

In this way, some implementations described herein prevent network outages by ensuring that an ARP table of a device is maintained during an ARP storm. For example, some implementations enable a device to receive ARP packets from other devices with which the device has currently active IP flows, even during an ARP storm, which enables the device to refresh entries in the ARP table associated with the other devices and maintain the currently active IP flows. As another example, the device may exchange IP keepalive messages with a different device, which enables the device to refresh an entry in the ARP table associated with the different device, even while ARP packets from the different device are dropped by the device due to an ARP storm, and maintain an active IP flow with the different device.

FIGS. 1A-1G are diagrams of one or more example implementations 100 described herein. Example implementation(s) 100 may include a first device (shown in FIGS. 1A-1G as device A), a second device (shown in FIGS. 1A-1G as device B), and/or a third device (shown in FIG. 1E as device C). The first device, the second device, and/or the third device may each include various types of network devices, such as a router, a gateway, a switch, a bridge, a wireless access point, a base station, a firewall, and/or the like. The first device and the second device may be included in a network, such as a cellular network, a local area network (LAN), a core network, an access network, a wide area network (WAN) such as the Internet, a cloud network, and/or the like. The first device, the second device, and/or the third device may communicate via the network and/or one or more links between the first device, the second device, and/or the third device.

As shown in FIG. 1A, the first device may include an ARP table that includes address information concerning one or more additional devices. For example, the ARP table may include a respective entry for each device that communicates with the first device. An entry of the ARP table may include MAC address information, IP address information, interface information (e.g., a communication port of the additional device), and/or the like concerning the device and/or expiration time information concerning the entry. For example, as shown in FIG. 1A, the ARP table for the first device includes an entry for the second device that indicates the second device has a MAC address value of "00:1b:c0:29:14:02," an IP address value of "10.10.10.1," an interface value of "ge-2/3/9/101," and a time-triggered Ethernet (TTE) value (e.g., an amount of time until expiration) of 1258 seconds.

As shown by reference number 102, the first device may send and/or receive one or more initial ARP packets to maintain the ARP table. For example, the first device may send an initial ARP packet to the second device to request up-to-date information concerning the second device. Moreover, the second device may send an initial ARP packet to the first device to provide up-to-date information concerning the second device. As shown by reference number 104, the first device may update the ARP table based on sending or receiving the one or more initial ARP packets. For example, based on receiving an initial ARP packet from the second device, the first device may update an entry associated with the second device in the ARP table to reflect the MAC address information, the IP address information, the interface information, and/or the like associated with the second device that is included in the initial ARP packet. The first device may also update and/or reset the expiration time information for the entry based on receiving the initial ARP packet.

As shown in FIG. 1A, the first device sends and/or receives one or more initial ARP packets to or from the second device, but implementations may include the first device sending and/or receiving one or more initial ARP packets to or from one or more additional devices (e.g., the third device and/or one or more other devices). The first device may update the ARP table based on receiving one or more initial ARP packets from the one or more additional devices in a similar manner as described herein. For example, the first device may determine a source MAC address associated with at least one ARP packet of the one or more initial ARP packets and update an expiration time included in an entry of the ARP table that is associated with the source MAC address.

As shown by reference number 106, the first device may determine and/or identify IP traffic monitoring criteria to monitor IP traffic received by the first device. For example, the IP traffic monitoring criteria may be based on a type of the IP traffic; a source of the IP traffic; a destination of the IP traffic; an incoming port of the IP traffic; an outgoing port of the IP traffic; and/or the like. A user, using a separate device, may interact with a user interface of the first device to configure the IP traffic monitoring criteria.

As shown in FIG. 1B and by reference number 108, the first device may send and/or receive IP traffic to or from another device, such as the second device. As shown by reference number 110, the first device may monitor the IP traffic based on the IP traffic monitoring criteria. For example, the first device may monitor IP traffic that is associated with a particular IP address, a particular MAC address, and/or the like.

In some implementations, the first device may include a table of currently active IP traffic flows. An IP traffic flow may include any IP traffic communicated between the first device and a particular device, such as the second device. The table of currently active IP traffic flows may include an entry for each IP traffic flow that the first device monitors. For example, the table of currently active IP traffic flows may include an entry for each device that sends IP traffic that satisfies the IP traffic monitoring criteria to the first device. An entry of the table of currently active IP traffic flows may include destination IP address information, next-hop IP address information, next-hop MAC address information, and/or the like associated with an IP traffic flow and an age (e.g., an amount of time since the IP traffic flow was received) of the IP traffic flow. For example, as shown in FIG. 1B, the table of currently active IP traffic flows includes an entry associated with an IP traffic flow with the second device that indicates a destination address of "10.10.10.1" (e.g., the IP address of the second device), a next-hop IP address of "10.10.10.1" (e.g., the IP address the second device), a next-hop MAC address of "00:1b:c0:29:14:02" (e.g., the MAC address of the second device), and an age of 30 seconds (e.g., 30 seconds since the first device and the second device communicated IP traffic).

As shown by reference number 112, the first device may update the table of currently active IP traffic flows based on monitoring the IP traffic. For example, the first device may determine, based on monitoring the IP traffic, an IP address and/or a MAC address of a device communicating with the first device and may update the table to include the IP address and/or the MAC address of the device. As another example, the first device may determine an age of an entry for an IP traffic flow in the table of currently active IP traffic flows and may determine whether the age satisfies a threshold (e.g., whether the age is greater than or equal to the threshold). When the first device determines that the age satisfies the threshold (e.g., the entry has expired), the first device may remove the entry from the table of currently active IP traffic.

Figure 1C:
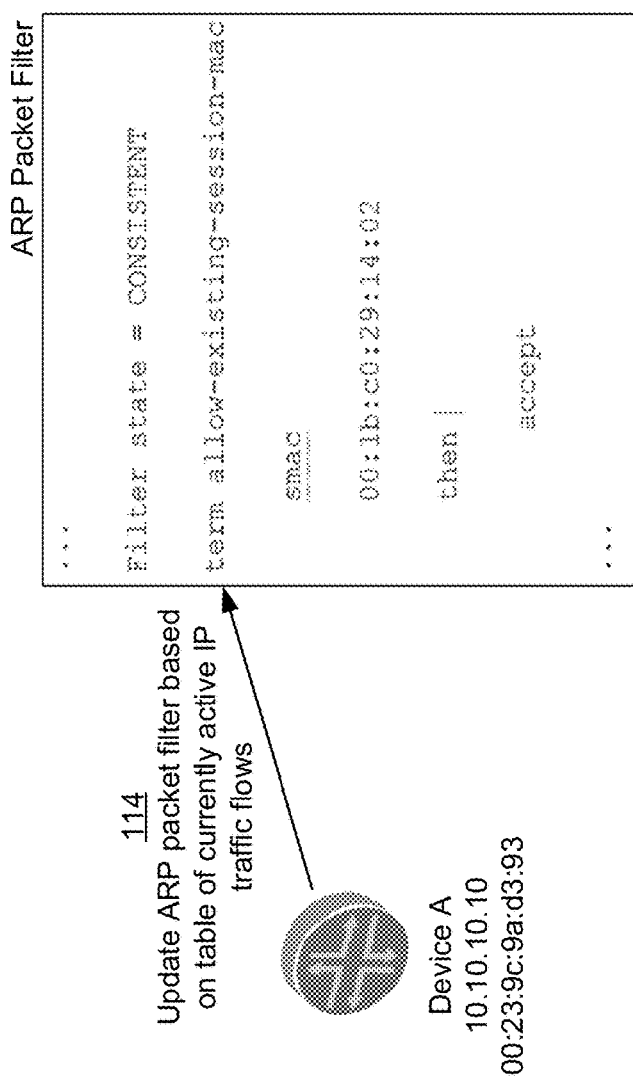

As shown in FIG. 1C and by reference number 114, the first device may update an ARP packet filter of the first device based on the table of currently active IP traffic flows. The first device may determine, based on the table of currently active IP traffic flows, at least one MAC address (e.g., at least one next-hop MAC address in the table of currently active IP traffic flows) associated with at least one device. The first device may update the ARP packet filter to allow ARP packets from the at least one MAC address. For example, as shown in FIG. 1C, the first device may update the ARP packet filter to accept ARP packets from a source MAC address of "00:1b:c0:29:14:02" (e.g., the second device).

As another example, the first device may determine that an entry associated with an IP traffic flow has been removed from the table of currently active IP traffic flows and may remove a MAC address associated with the entry from the ARP packet filter. In another example, the first device may determine that a MAC address included in an entry associated with an IP traffic flow in the table of currently active IP traffic flows has changed. The first device may update the ARP packet filter to include the MAC address that has changed.

Figure 1D:
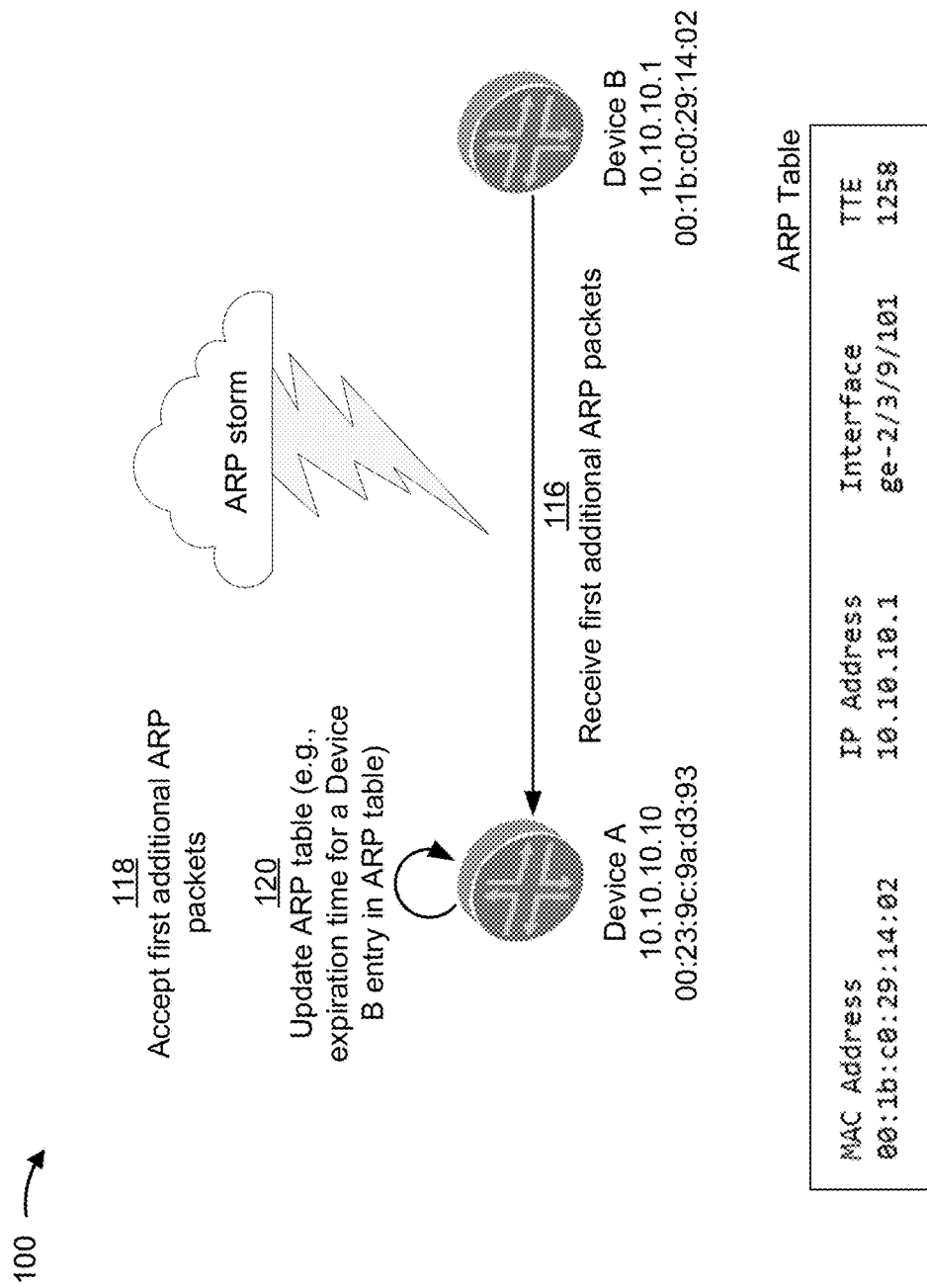

In some implementations, as shown in FIGS. 1D and 1E, the first device may be subjected to an ARP storm (e.g., the first device may receive more ARP packets during a period of time than it can process during the period of time). In some implementations, the first device may determine whether to accept or discard one or more ARP packets that comprise the ARP storm based on the ARP packet filter. For example, the first device may identify and/or determine an allowed MAC address in the ARP packet filter and may determine to accept at least one ARP packet of the one or more ARP packets based on the allowed MAC address matching a MAC address associated with the at least one ARP packet. Accordingly, the first device may determine to discard the at least one ARP packet if the allowed MAC address does not match a MAC address of the at least one ARP packet. In another example, the first device may determine a bandwidth requirement defined in the ARP packet filter and may determine whether accepting the at least one ARP packet would exceed the bandwidth requirement. The first device may accept the at least one ARP packet if accepting the at least one ARP packet would not exceed the bandwidth requirement and may discard the at least one ARP packet if accepting the at least one ARP packet would exceed the bandwidth requirement.

FIG. 1D shows an example scenario when the first device determines to accept ARP packets in an ARP storm. As shown by reference number 116, the first device may receive one or more first additional ARP packets from the second device. The one or more first additional ARP packets may be part of the ARP storm. The first device may determine to accept the first additional ARP packets in a similar manner as described herein. Accordingly, as shown by reference number 118, the first device may accept the one or more first additional ARP packets. The first device may process the one or more first additional ARP packets and, as shown by reference number 120, may update the ARP table. For example, as shown in FIG. 1D, the first device may update an expiration time (e.g., update the TTE value to 1258 seconds) for an entry associated with the second device in the ARP table. As another example, the first device may update the MAC address value, the IP address value, the interface value, and/or the like of the entry based on the information included in the one or more first additional ARP packets.

FIG. 1E shows an example scenario when the first device determines to discard ARP packets in an ARP storm. As shown by reference number 122, the first device may receive one or more second additional ARP packets from the third device (e.g., shown in FIG. 1E as Device C). The one or more second additional ARP packets may be part of the ARP storm. The first device may determine to discard the second additional ARP packets in a similar manner as described herein. For example, the first device may determine to discard the second additional ARP packets because a MAC address of the third device does not match a MAC address of the ARP packet filter and/or because allowing the second additional ARP packets would exceed a bandwidth requirement defined in the ARP packet filter. Accordingly, as shown by reference number 124, the first device may discard the one or more second additional ARP packets (e.g., drop the one or more second additional ARP packets without processing the one or more second additional ARP packets). In some implementations, the first device may determine, after discarding the one or more second additional ARP packets, that an entry of the ARP table associated with the third device has expired (e.g., because the first device did not process any ARP packets to enable the first device to update an entry for the third device in the ARP table) and therefore may remove the entry from the ARP table.

Other implementations are contemplated with regard to example implementation(s) 100. In some implementations, the first device may utilize IP keepalive messages in addition to, or as an alternative to, implementations that utilize the ARP packet filter as described herein.

Figure 1F:
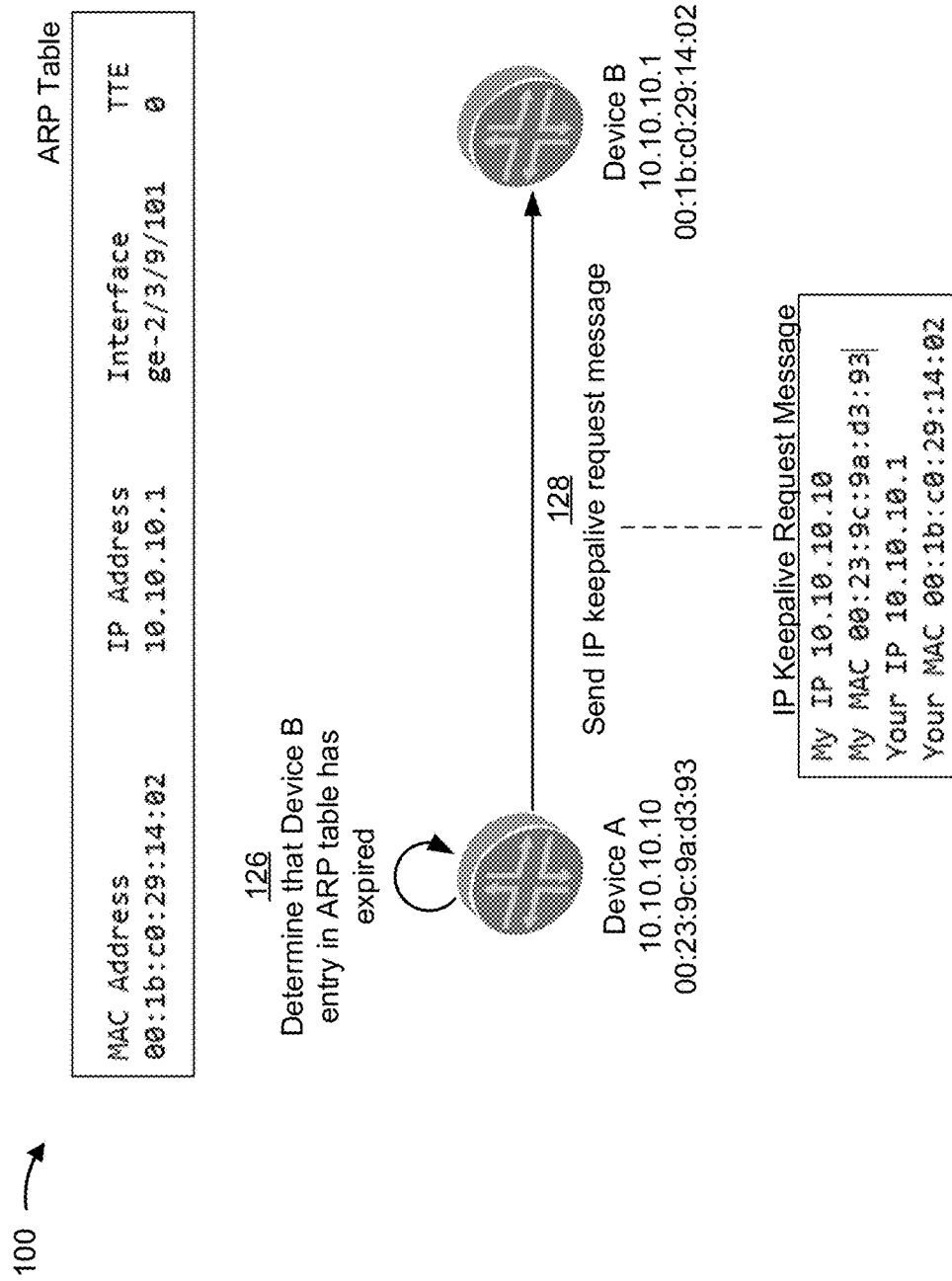

For example, as shown in FIG. 1F and by reference number 126, the first device may determine that an entry associated with the second device in the ARP table has expired (e.g., because the first device has not received an ARP packet from the second device to cause the first device to update and/or reset expiration time information concerning the entry). Accordingly, as shown by reference number 128, the first device may send one or more IP keepalive request messages to the second device (e.g., instead of sending one or more ARP packets). An IP keepalive request message may include information concerning an IP address and/or a MAC address of the first device, information concerning an IP address and/or a MAC address of the second device, and/or the like. For example, as shown in FIG. 1F, the first device may send an IP keepalive request message to the second device that indicates that the first device has an IP address value of "10.10.10.10" and a MAC address value of "00:23:9c:9a:d3:93 and that the second device has an IP address value of "10.10.10.1" and a MAC address value of "00:1b:c0:29:14:02." The first device may determine information to include in the IP keepalive request message based on the ARP table and/or the table of currently active IP traffic flows.

Figure 1G:
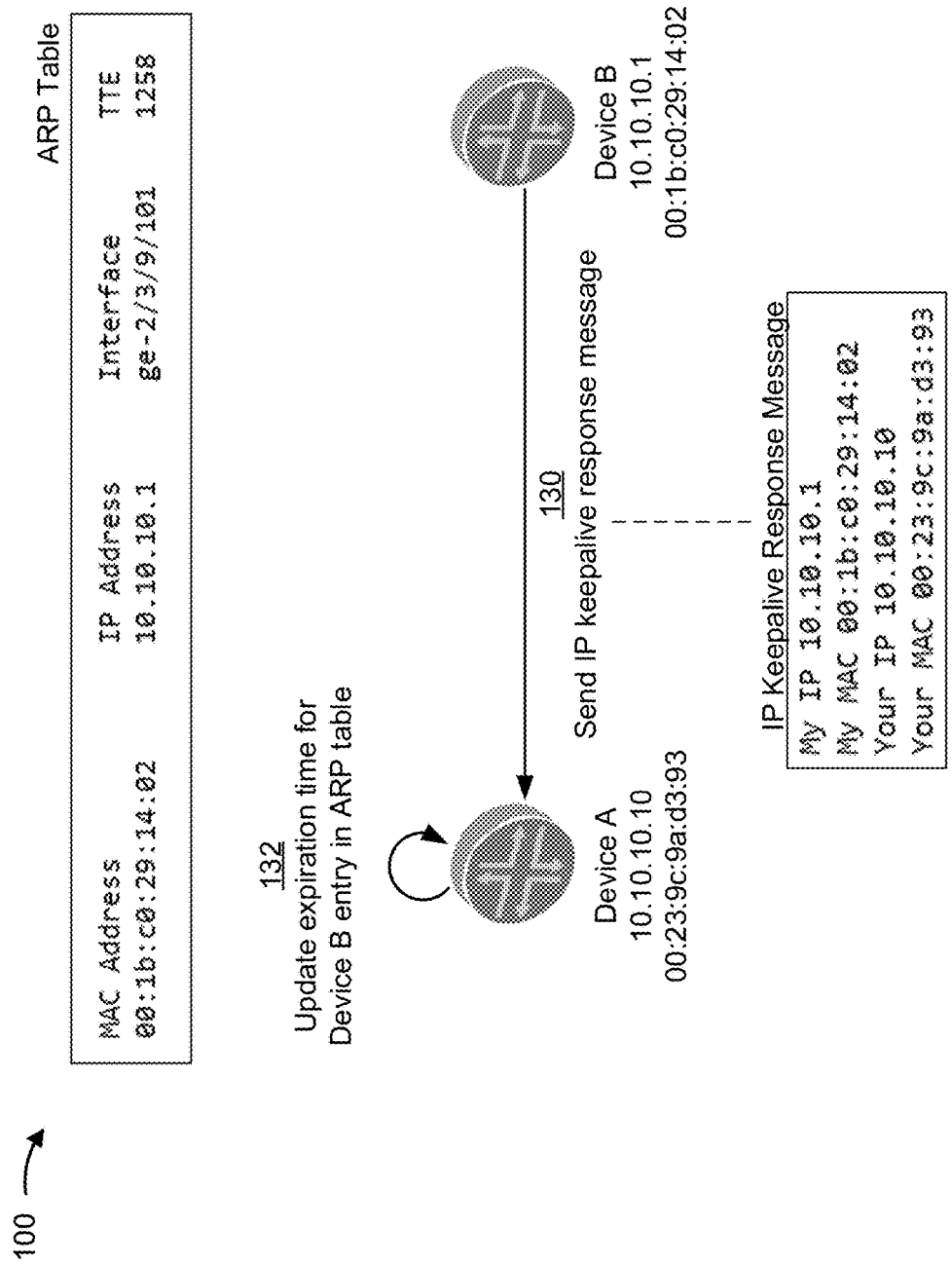

In some implementations, the second device may, based on receiving the IP keepalive request message, update an ARP table and/or a table of currently active IP traffic flows of the second device in a similar manner as described herein. As shown in FIG. 1G and by reference number 130, the second device may, in response to receiving the IP keepalive request message, send one or more IP keepalive response messages to the first device. An IP keepalive response message may include information concerning an IP address and/or a MAC address of the first device, information concerning an IP address and/or a MAC address of the second device, and/or the like. For example, as shown in FIG. 1F, the second device may send an IP keepalive response message to the first device that indicates that the second device has an IP address value of "10.10.10.1" and a MAC address value of "00:1b:c0:29:14:02." and that the first device has an IP address value of "10.10.10.10" and a MAC address value of "00:23:9c:9a:d3:93. The second device may determine information to include in the IP keepalive response message based on the ARP table and/or the table of currently active IP traffic flows included in the second device. In some implementations, the IP keepalive response message may include updated information concerning an IP address and/or MAC address of the second device (e.g., that may be different than the IP address and/or MAC address of the second device indicated in the IP keepalive request message).

As shown by reference number 132 in FIG. 1G, the first device may update the ARP table of the first device based on the one or more IP keepalive response messages. For example, the first device may update an expiration time for an entry associated with the second device in the ARP table (e.g., update the ARP table to indicate that the second device has not expired). As another example, the first device may update an IP address and/or MAC address included in an entry associated with the second device in the ARP table based on the information concerning the second device in the one or more IP keepalive response messages.

As indicated above, FIGS. 1A-1G are provided merely as one or more examples. Other examples may differ from what is described with regard to FIGS. 1A-1G.

Figure 2:
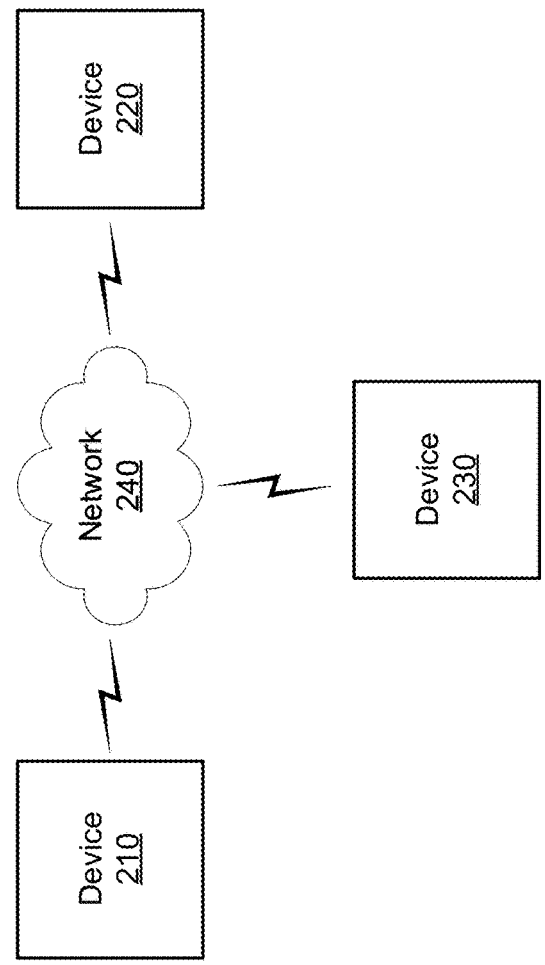
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include device 210, device 220, and/or device 230. Devices of environment 200 may interconnect via wired connections, wireless connections, or a combination of wired and wireless connections.

Device 210 includes one or more devices capable of receiving, storing, generating, processing, forwarding, and/or transferring information. For example, device 210 may include a router, a switch, a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, device 210 may be a physical device implemented within a housing, such as a chassis. In some implementations, device 210 may be a virtual device implemented by one or more computer devices of a cloud computing environment or a data center. In some implementations, device 210 may include an address resolution protocol (ARP) packet filter, an ARP table, a table of currently active IP traffic flows, and/or the like. In some implementations, device 210 may communicate with device 220 and/or device 230 via one or more links and/or network 240.

Device 220 includes one or more devices capable of receiving, storing, generating, processing, forwarding, and/or transferring information. For example, device 220 may include a router, a switch, a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, device 220 may be a physical device implemented within a housing, such as a chassis. In some implementations, device 220 may be a virtual device implemented by one or more computer devices of a cloud computing environment or a data center. In some implementations, device 220 may include an ARP packet filter, an ARP table, a table of currently active IP traffic flows, and/or the like. In some implementations, device 220 may communicate with device 210 and/or device 230 via one or more links and/or network 240.

Device 230 includes one or more devices capable of receiving, storing, generating, processing, forwarding, and/or transferring information. For example, device 230 may include a router, a switch, a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, device 230 may be a physical device implemented within a housing, such as a chassis. In some implementations, device 230 may be a virtual device implemented by one or more computer devices of a cloud computing environment or a data center. In some implementations, device 230 may include an ARP packet filter, an ARP table, a table of currently active IP traffic flows, and/or the like. In some implementations, device 230 may communicate with device 210 and/or device 220 via one or more links and/or network 240.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

The number and arrangement of devices and networks shown in FIG. 2 are provided as one or more examples. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
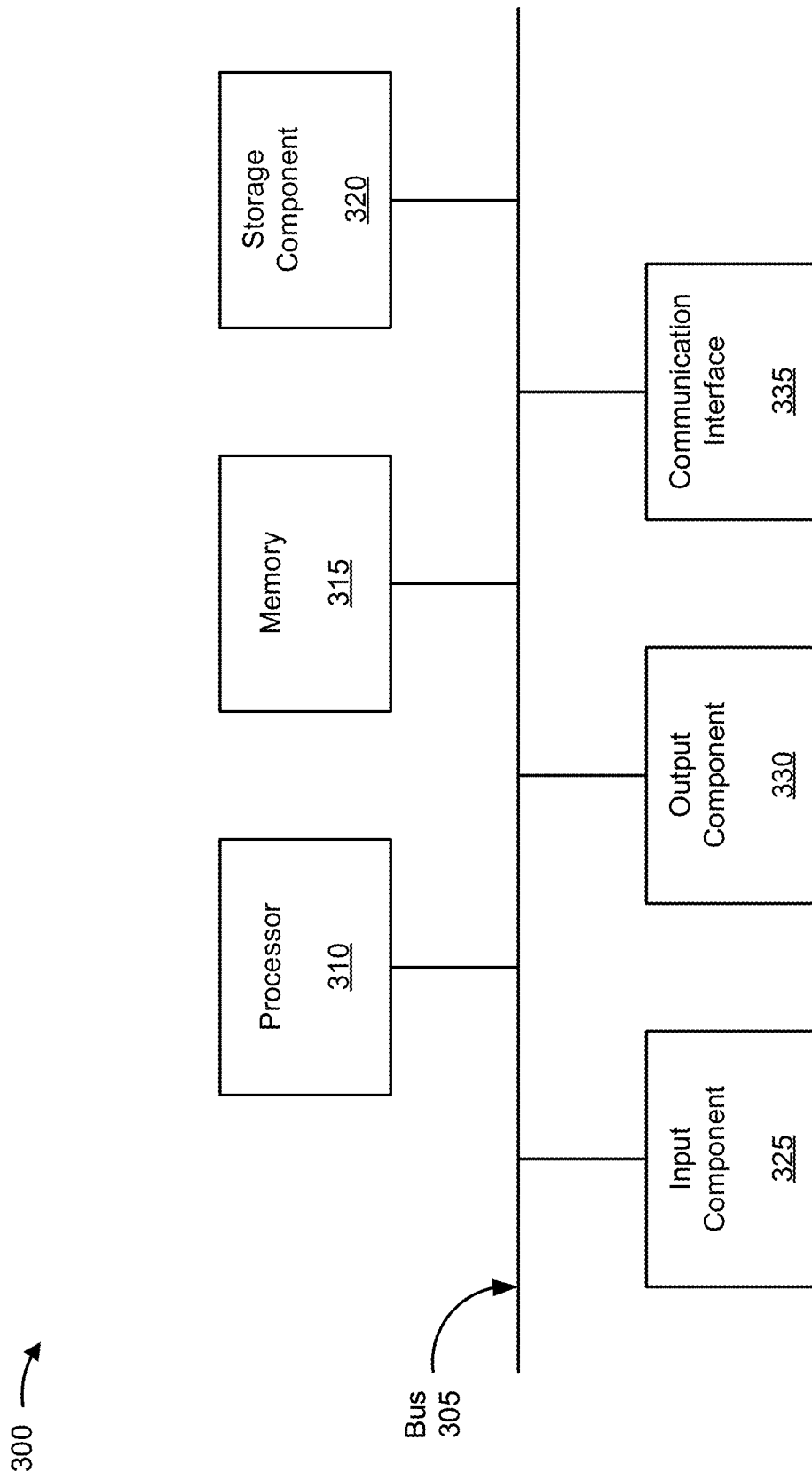
FIGS. 3A and 3B are diagrams of example components of one or more devices of FIG. 2.
Figure 3B:
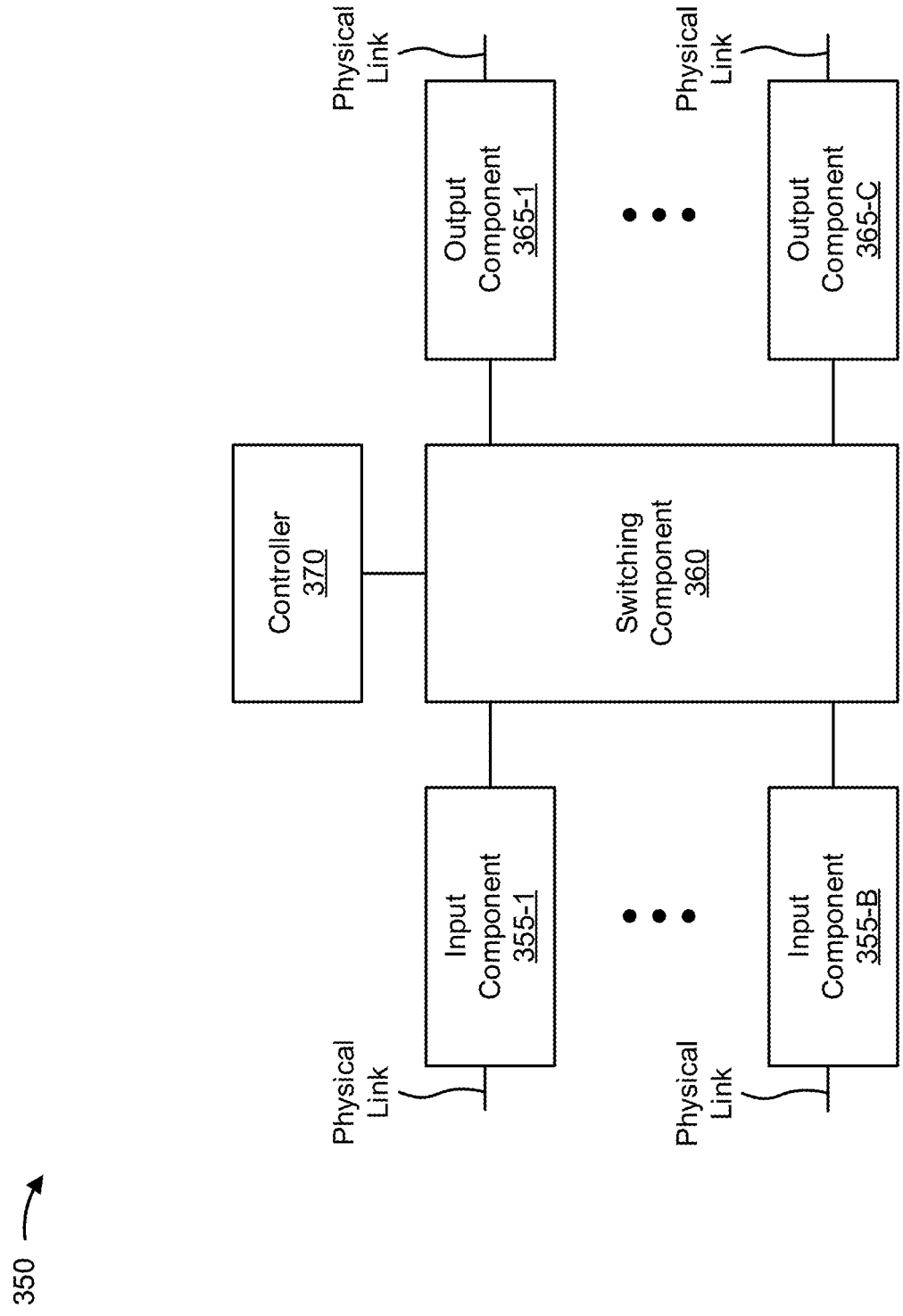

FIGS. 3A-3B are diagrams of example components of one or more devices of FIG. 2. FIG. 3A is a diagram of example components of a device 300. Device 300 may correspond to device 210, device 220, device 230, and/or the like. In some implementations, device 210, device 220, device 230, and/or the like may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to device 210, device 220, device 230, and/or the like. In some implementations, device 210, device 220, device 230, and/or the like may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
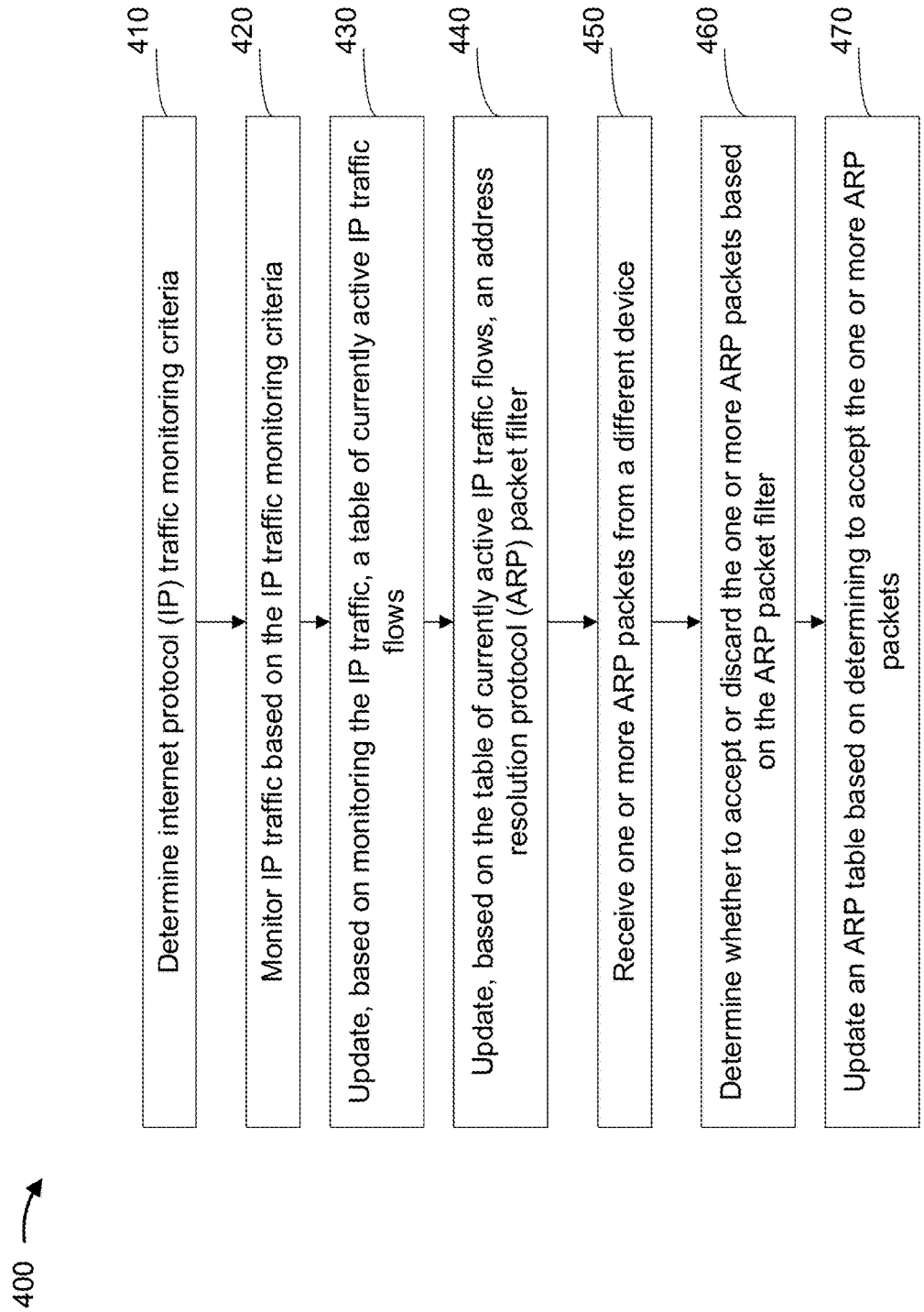
FIGS. 4-6 are flow charts of example processes for preventing traffic outages during address resolution protocol (ARP) storms.

FIG. 4 is a flow chart of an example process 400 for preventing traffic outages during address resolution protocol (ARP) storms. In some implementations, one or more process blocks of FIG. 4 may be performed by a device (e.g., device 210). In some implementations, one or more process blocks of FIG. 4 may be performed by another device or a group of devices separate from or including the device, such as device 220, device 230, and/or the like.

As shown in FIG. 4, process 400 may include determining internet protocol (IP) traffic monitoring criteria (block 410). For example, the device (e.g., using processor 310, memory 315, storage component 320, input component 325, output component 330, communication interface 335, input component(s) 355, switching component 360, output component(s) 365, controller 370, and/or the like) may determine IP traffic monitoring criteria, as described above.

As further shown in FIG. 4, process 400 may include monitoring IP traffic based on the IP traffic monitoring criteria (block 420). For example, the device (e.g., using processor 310, memory 315, storage component 320, input component 325, output component 330, communication interface 335, input component(s) 355, switching component 360, output component(s) 365, controller 370, and/or the like) may monitor IP traffic based on the IP traffic monitoring criteria, as described above.

As further shown in FIG. 4, process 400 may include updating, based on monitoring the IP traffic, a table of currently active IP traffic flows (block 430). For example, the device (e.g., using processor 310, memory 315, storage component 320, input component 325, output component 330, communication interface 335, input component(s) 355, switching component 360, output component(s) 365, controller 370, and/or the like) may update, based on monitoring the IP traffic, a table of currently active IP traffic flows, as described above.

As further shown in FIG. 4, process 400 may include updating, based on the table of currently active IP traffic flows, an address resolution protocol (ARP) packet filter (block 440). For example, the device (e.g., using processor 310, memory 315, storage component 320, input component 325, output component 330, communication interface 335, input component(s) 355, switching component 360, output component(s) 365, controller 370, and/or the like) may update, based on the table of currently active IP traffic flows, an ARP packet filter, as described above.

As further shown in FIG. 4, process 400 may include receiving one or more ARP packets from a different device (block 450). For example, the device (e.g., using processor 310, memory 315, storage component 320, input component 325, output component 330, communication interface 335, input component(s) 355, switching component 360, output component(s) 365, controller 370, and/or the like) may receive one or more ARP packets from a different device, as described above.

As further shown in FIG. 4, process 400 may include determining whether to accept or discard the one or more ARP packets based on the ARP packet filter (block 460). For example, the device (e.g., using processor 310, memory 315, storage component 320, input component 325, output component 330, communication interface 335, input component(s) 355, switching component 360, output component(s) 365, controller 370, and/or the like) may determine whether to accept or discard the one or more ARP packets based on the ARP packet filter, as described above.

As further shown in FIG. 4, process 400 may include updating an ARP table based on determining to accept the one or more ARP packets (block 470). For example, the device (e.g., using processor 310, memory 315, storage component 320, input component 325, output component 330, communication interface 335, input component(s) 355, switching component 360, output component(s) 365, controller 370, and/or the like) may update an ARP table based on determining to accept the one or more ARP packets, as described above.

Process 400 may include additional implementations, such as any single implementation or any combination of implementations described below and/or in connection with one or more other processes described elsewhere herein.

In a first implementation, the IP traffic monitoring criteria are based on at least one of a type of the IP traffic; a source of the IP traffic; a destination of the IP traffic; an incoming port of the IP traffic; or an outgoing port of the IP traffic.

In a second implementation, alone or in combination with the first implementation, updating the table of currently active IP traffic flows comprises determining, based on monitoring the IP traffic, an IP address and a media access control (MAC) address of an additional device communicating with the device; and updating the table of currently active IP traffic flows to include the IP address and the MAC address of the additional device.

In a third implementation, alone or in combination with one or more of the first and second implementations, updating the ARP packet filter comprises determining, based on the table of currently active IP traffic flows, at least one MAC address associated with at least one additional device; and updating the ARP packet filter to allow ARP packets from the at least one MAC address.

In a fourth implementation, alone or in combination with one or more of the first through third implementations, determining whether to accept or discard the one or more ARP packets comprises determining, based on the ARP packet filter, an allowed MAC address; and determining to accept the one or more ARP packets based on the allowed MAC address matching a MAC address associated with the one or more ARP packets.

In a fifth implementation, alone or in combination with one or more of the first through fourth implementations, process 400 may further include determining that an entry associated with the different device in the ARP table has expired, sending an IP keepalive request message to the different device, receiving an IP keepalive response message from the different device, and updating an expiration time associated with the entry in the ARP table based on the IP keepalive response message.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
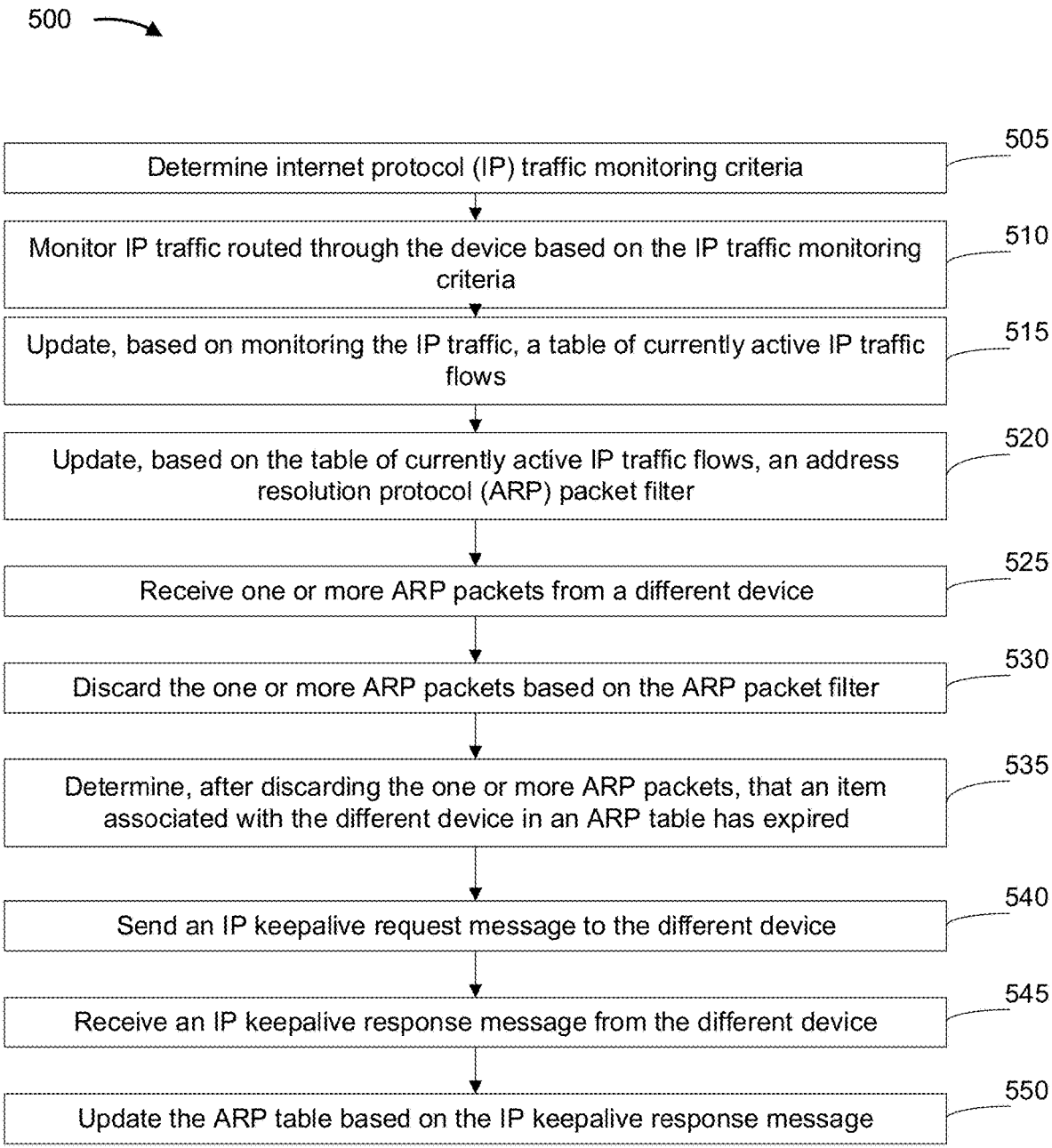

FIG. 5 is a flow chart of an example process 500 for preventing traffic outages during address resolution protocol (ARP) storms. In some implementations, one or more process blocks of FIG. 5 may be performed by a device (e.g., device 210). In some implementations, one or more process blocks of FIG. 5 may be performed by another device or a group of devices separate from or including the device, such as device 220, device 230, and/or the like.

As shown in FIG. 5, process 500 may include determining IP traffic monitoring criteria (block 505). For example, the device (e.g., using processor 310, memory 315, storage component 320, input component 325, output component 330, communication interface 335, input component(s) 355, switching component 360, output component(s) 365, controller 370, and/or the like) may determine IP traffic monitoring criteria, as described above.

As further shown in FIG. 5, process 500 may include monitoring IP traffic routed through the device based on the IP traffic monitoring criteria (block 510). For example, the device (e.g., using processor 310, memory 315, storage component 320, input component 325, output component 330, communication interface 335, input component(s) 355, switching component 360, output component(s) 365, controller 370, and/or the like) may monitor IP traffic routed through the device based on the IP traffic monitoring criteria, as described above.

As further shown in FIG. 5, process 500 may include updating, based on monitoring the IP traffic, a table of currently active IP traffic flows (block 515). For example, the device (e.g., using processor 310, memory 315, storage component 320, input component 325, output component 330, communication interface 335, input component(s) 355, switching component 360, output component(s) 365, controller 370, and/or the like) may update, based on monitoring the IP traffic, a table of currently active IP traffic flows, as described above.

As further shown in FIG. 5, process 500 may include updating, based on the table of currently active IP traffic flows, an ARP packet filter (block 520). For example, the device (e.g., using processor 310, memory 315, storage component 320, input component 325, output component 330, communication interface 335, input component(s) 355, switching component 360, output component(s) 365, controller 370, and/or the like) may update, based on the table of currently active IP traffic flows, an ARP packet filter, as described above.

As further shown in FIG. 5, process 500 may include receiving one or more ARP packets from a different device (block 525). For example, the device (e.g., using processor 310, memory 315, storage component 320, input component 325, output component 330, communication interface 335, input component(s) 355, switching component 360, output component(s) 365, controller 370, and/or the like) may receive one or more ARP packets from a different device, as described above.

As further shown in FIG. 5, process 500 may include discarding the one or more ARP packets based on the ARP packet filter (block 530). For example, the device (e.g., using processor 310, memory 315, storage component 320, input component 325, output component 330, communication interface 335, input component(s) 355, switching component 360, output component(s) 365, controller 370, and/or the like) may discard the one or more ARP packets based on the ARP packet filter, as described above.

As further shown in FIG. 5, process 500 may include determining, after discarding the one or more ARP packets, that an item associated with the different device in an ARP table has expired (block 535). For example, the device (e.g., using processor 310, memory 315, storage component 320, input component 325, output component 330, communication interface 335, input component(s) 355, switching component 360, output component(s) 365, controller 370, and/or the like) may determine, after discarding the one or more ARP packets, that an item associated with the different device in an ARP table has expired, as described above.

As further shown in FIG. 5, process 500 may include sending an IP keepalive request message to the different device (block 540). For example, the device (e.g., using processor 310, memory 315, storage component 320, input component 325, output component 330, communication interface 335, input component(s) 355, switching component 360, output component(s) 365, controller 370, and/or the like) may send an IP keepalive request message to the different device, as described above.

As further shown in FIG. 5, process 500 may include receiving an IP keepalive response message from the different device (block 545). For example, the device (e.g., using processor 310, memory 315, storage component 320, input component 325, output component 330, communication interface 335, input component(s) 355, switching component 360, output component(s) 365, controller 370, and/or the like) may receive an IP keepalive response message from the different device, as described above.

As further shown in FIG. 5, process 500 may include updating the ARP table based on the IP keepalive response message (block 550). For example, the device (e.g., using processor 310, memory 315, storage component 320, input component 325, output component 330, communication interface 335, input component(s) 355, switching component 360, output component(s) 365, controller 370, and/or the like) may update the ARP table based on the IP keepalive response message, as described above.

Process 500 may include additional implementations, such as any single implementation or any combination of implementations described below and/or in connection with one or more other processes described elsewhere herein.

In a first implementation, the IP keepalive request message includes information concerning an IP address and a MAC address of the device and information concerning an IP address and a MAC address of the different device.

In a second implementation, alone or in combination with the first implementation, discarding the one or more ARP packets includes determining, based on the ARP packet filter, a bandwidth requirement; determining that accepting the one or more ARP packets would exceed the bandwidth requirement; determining that a MAC address associated with the one or more ARP packets does not match any MAC address of the ARP packet filter; and discarding the one or more ARP packets.

In a third implementation, alone or in combination with one or more of the first and second implementations, the table of currently active IP traffic flows includes a respective entry for each of one or more IP traffic flows, and updating the table of currently active IP traffic flows includes determining an age of an entry for an IP traffic flow in the table of currently active IP traffic flows, determining that the age satisfies a threshold, and removing, based on the age satisfying the threshold, the entry from the table of currently active IP traffic flows.

In a fourth implementation, alone or in combination with one or more of the first through third implementations, updating the ARP packet filter includes determining that an entry associated with an IP traffic flow has been removed from the table of currently active IP traffic flows, and removing a MAC address associated with the entry from the ARP packet filter.

In a fifth implementation, alone or in combination with one or more of the first through fourth implementations, updating the ARP table based on the IP keepalive response message includes updating an expiration time associated with the item in the ARP table based on the IP keepalive response message.

In a sixth implementation, alone or in combination with one or more of the first through fifth implementations, the IP keepalive response message includes updated information concerning an IP address or a MAC address associated with the different device, and updating the ARP table based on the IP keepalive response message includes updating an IP address or a MAC address included in an entry associated with the different device in the ARP table based on the updated information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
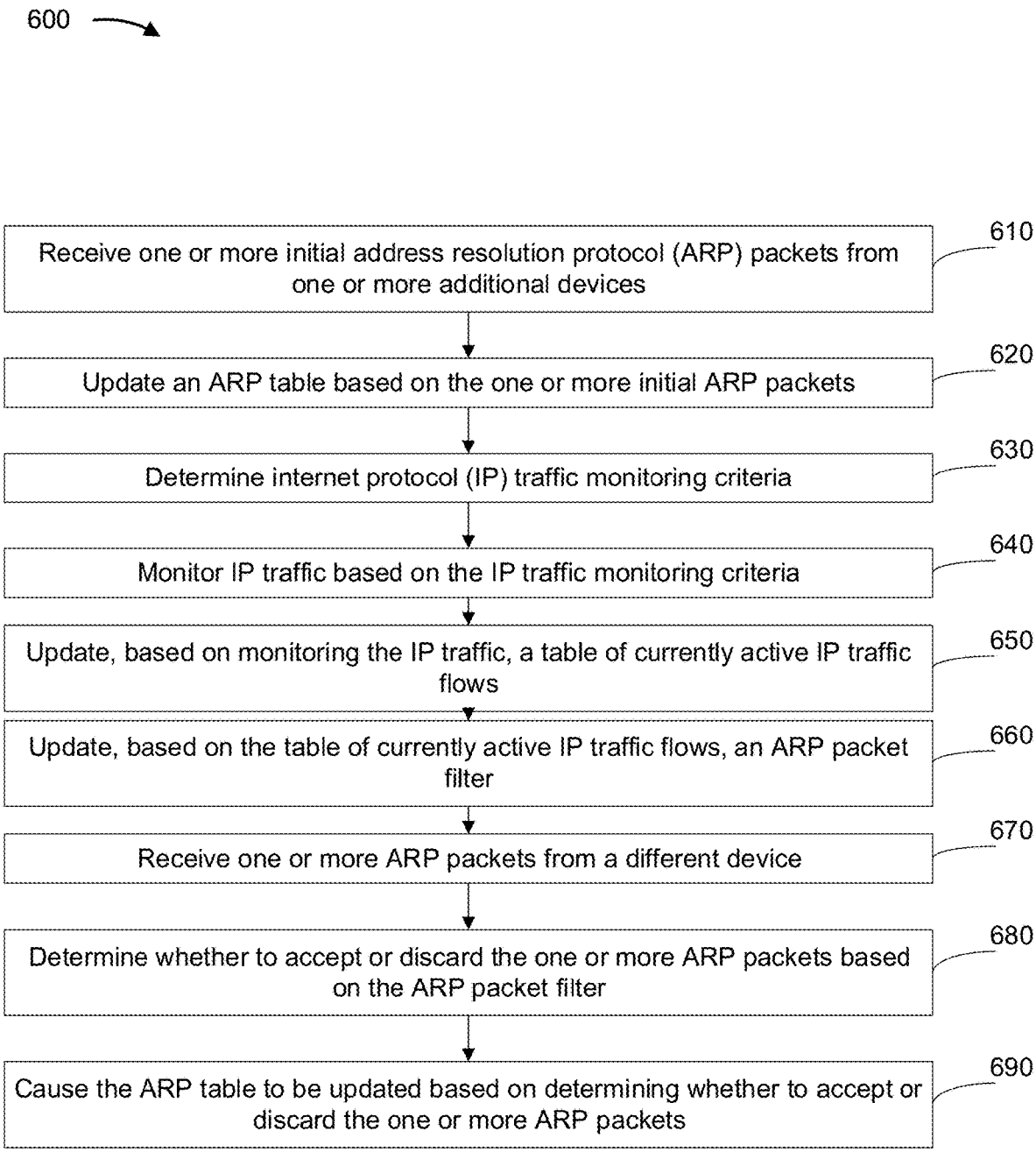

FIG. 6 is a flow chart of an example process 600 for preventing traffic outages during ARP storms. In some implementations, one or more process blocks of FIG. 6 may be performed by a device (e.g., device 210). In some implementations, one or more process blocks of FIG. 6 may be performed by another device or a group of devices separate from or including the device, such as device 220, device 230, and/or the like.

As shown in FIG. 6, process 600 may include receiving one or more initial ARP packets from one or more additional devices (block 610). For example, the device (e.g., using processor 310, memory 315, storage component 320, input component 325, output component 330, communication interface 335, input component(s) 355, switching component 360, output component(s) 365, controller 370, and/or the like) may receive one or more initial ARP packets from one or more additional devices, as described above.

As further shown in FIG. 6, process 600 may include updating an ARP table based on the one or more initial ARP packets (block 620). For example, the device (e.g., using processor 310, memory 315, storage component 320, input component 325, output component 330, communication interface 335, input component(s) 355, switching component 360, output component(s) 365, controller 370, and/or the like) may update an ARP table based on the one or more initial ARP packets, as described above.

As further shown in FIG. 6, process 600 may include determining IP traffic monitoring criteria (block 630). For example, the device (e.g., using processor 310, memory 315, storage component 320, input component 325, output component 330, communication interface 335, input component(s) 355, switching component 360, output component(s) 365, controller 370, and/or the like) may determine IP traffic monitoring criteria, as described above.

As further shown in FIG. 6, process 600 may include monitoring IP traffic based on the IP traffic monitoring criteria (block 640). For example, the device (e.g., using processor 310, memory 315, storage component 320, input component 325, output component 330, communication interface 335, input component(s) 355, switching component 360, output component(s) 365, controller 370, and/or the like) may monitor IP traffic based on the IP traffic monitoring criteria, as described above.

As further shown in FIG. 6, process 600 may include updating, based on monitoring the IP traffic, a table of currently active IP traffic flows (block 650). For example, the device (e.g., using processor 310, memory 315, storage component 320, input component 325, output component 330, communication interface 335, input component(s) 355, switching component 360, output component(s) 365, controller 370, and/or the like) may update, based on monitoring the IP traffic, a table of currently active IP traffic flows, as described above.

As further shown in FIG. 6, process 600 may include updating, based on the table of currently active IP traffic flows, an ARP packet filter (block 660). For example, the device (e.g., using processor 310, memory 315, storage component 320, input component 325, output component 330, communication interface 335, input component(s) 355, switching component 360, output component(s) 365, controller 370, and/or the like) may update, based on the table of currently active IP traffic flows, an ARP packet filter, as described above.

As further shown in FIG. 6, process 600 may include receiving one or more ARP packets from a different device (block 670). For example, the device (e.g., using processor 310, memory 315, storage component 320, input component 325, output component 330, communication interface 335, input component(s) 355, switching component 360, output component(s) 365, controller 370, and/or the like) may receive one or more ARP packets from a different device, as described above.

As further shown in FIG. 6, process 600 may include determining whether to accept or discard the one or more ARP packets based on the ARP packet filter (block 680). For example, the device (e.g., using processor 310, memory 315, storage component 320, input component 325, output component 330, communication interface 335, input component(s) 355, switching component 360, output component(s) 365, controller 370, and/or the like) may determine whether to accept or discard the one or more ARP packets based on the ARP packet filter, as described above.

As further shown in FIG. 6, process 600 may include causing the ARP table to be updated based on determining whether to accept or discard the one or more ARP packets (block 690). For example, the device (e.g., using processor 310, memory 315, storage component 320, input component 325, output component 330, communication interface 335, input component(s) 355, switching component 360, output component(s) 365, controller 370, and/or the like) may cause the ARP table to be updated based on determining whether to accept or discard the one or more ARP packets, as described above.

Process 600 may include additional implementations, such as any single implementation or any combination of implementations described below and/or in connection with one or more other processes described elsewhere herein.

In a first implementation, determining whether to accept or discard the one or more ARP packets based on the ARP packet filter includes determining, based on the ARP packet filter, a bandwidth requirement; and determining that accepting the one or more ARP packets would not exceed the bandwidth requirement.

In a second implementation, alone or in combination with the first implementation, the one or more instructions, updating the ARP packet filter includes determining that a MAC address included in an entry associated with an IP traffic flow in the table of currently active IP traffic flows has changed; and updating the ARP packet filter to include the MAC address that has changed.

In a third implementation, alone or in combination with one or more of the first and second implementations, updating the ARP table based on the one or more initial ARP packets includes determining a source MAC address associated with at least one ARP packet of the one or more initial ARP packets, and updating an expiration time included in an entry of the ARP table that is associated with the source MAC address.

In a fourth implementation, alone or in combination with one or more of the first through third implementations, causing the ARP table to be updated based on determining whether to accept or discard the one or more ARP packets includes updating, based on determining to accept the one or more ARP packets, an expiration time associated with an entry of the ARP table that concerns the different device.

In a fifth implementation, alone or in combination with one or more of the first through fourth implementations, causing the ARP table to be updated based on determining whether to accept or discard the one or more ARP packets includes determining, based on determining to discard the one or more ARP packets, that an entry of the ARP table that concerns the different device has expired, and removing the entry from the ARP table.

In a sixth implementation, alone or in combination with one or more of the first through fifth implementations, causing the ARP table to be updated based on determining whether to accept or discard the one or more ARP packets includes determining, based on determining to discard the one or more ARP packets, that an entry of the ARP table that concerns the different device has expired; sending an IP keepalive request message to the different device; receiving an IP keepalive response message from the different device; and updating the ARP table to indicate that the different device has not expired based on the IP keepalive response message.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a device, internet protocol (IP) traffic monitoring criteria;
   monitoring, by the device, IP traffic based on the IP traffic monitoring criteria;
   updating, by the device and based on monitoring the IP traffic, one or more entries in a table of currently active IP traffic flows;
   updating, by the device and based on updating the one or more entries in the table of currently active IP traffic flows, one or more corresponding addresses in an address resolution protocol (ARP) packet filter;
   receiving, by the device and from a different device, one or more ARP packets,
      wherein a quantity of the one or more ARP packets is greater than a quantity of packets that the device is capable of processing during a period of time;
   determining, by the device and during the period of time, whether to accept or discard the one or more ARP packets based on an address or processing information associated the one or more ARP packets and an acceptable address or acceptable processing information associated with the ARP packet filter; and
   updating, by the device, an ARP table based on determining to accept the one or more ARP packets.

2. The method of claim 1, wherein the IP traffic monitoring criteria are based on at least one of:
   a type of the IP traffic;
   a source of the IP traffic;
   a destination of the IP traffic;
   an incoming port of the IP traffic; or
   an outgoing port of the IP traffic.

3. The method of claim 1, wherein updating the table of currently active IP traffic flows comprises:
   determining, based on monitoring the IP traffic, an IP address and a media access control (MAC) address of an additional device communicating with the device; and
   updating the table of currently active IP traffic flows to include the IP address and the MAC address of the additional device.

4. The method of claim 1, wherein updating the one or more corresponding address in the ARP packet filter comprises:
   determining, based on updating the one or more entries in the table of currently active IP traffic flows, at least one media access control (MAC) address associated with at least one additional device; and
   updating the ARP packet filter to allow ARP packets from the at least one MAC address.

5. The method of claim 1, wherein determining whether to accept or discard the one or more ARP packets comprises:
   determining, during the period of time and based on the ARP packet filter, an allowed media access control (MAC) address; and
   determining to accept the one or more ARP packets based on the allowed MAC address matching a MAC address associated with the one or more ARP packets.

6. The method of claim 1, further comprising:
   determining that an entry associated with the different device in the ARP table has expired;
   sending an IP keepalive request message to the different device;
   receiving an IP keepalive response message from the different device; and
   updating an expiration time associated with the entry in the ARP table based on receiving the IP keepalive response message.

7. A device, comprising:
   one or more memories; and
   one or more processors to:
      determine internet protocol (IP) traffic monitoring criteria;
      monitor IP traffic routed through the device based on the IP traffic monitoring criteria;
      update, based on monitoring the IP traffic, one or more entries in a table of currently active IP traffic flows;
      update, based on updating the one or more entries in the table of currently active IP traffic flows, one or more corresponding addresses in an address resolution protocol (ARP) packet filter;
      receive one or more ARP packets from a different device,
         wherein a quantity of the one or more ARP packets is greater than a quantity of packets that the device is capable of processing during a period of time;
      discard, during the period of time, the one or more ARP packets based on an address or processing information associated the one or more ARP packets and an acceptable address or acceptable processing information associated with the ARP packet filter;
      determine, after discarding the one or more ARP packets, that an item associated with the different device in an ARP table has expired;
      send an IP keepalive request message to the different device;
      receive an IP keepalive response message from the different device; and
      update the ARP table based on receiving the IP keepalive response message.

8. The device of claim 7, wherein the IP keepalive request message includes information concerning an IP address and a media access control (MAC) address of the device and information concerning an IP address and a MAC address of the different device.

9. The device of claim 7, wherein the one or more processors, when discarding the one or more ARP packets, are to:
   determine, based on the one or more corresponding addresses in the ARP packet filter, a bandwidth requirement;
   determine that accepting the one or more ARP packets does not exceed the bandwidth requirement;
   determine that accepting the one or more ARP packets would exceed the bandwidth requirement;
   determine that a media access control (MAC) address associated with the one or more ARP packets does not match any MAC address of the ARP packet filter; and
   discard the one or more ARP packets.

10. The device of claim 7, wherein the table of currently active IP traffic flows includes a respective entry for each of one or more IP traffic flows,
   wherein the one or more processors, when updating the table of currently active IP traffic flows, are to:
      determine an age of an entry for an IP traffic flow in the table of currently active IP traffic flows;
      determine that the age satisfies a threshold; and
      remove, based on the age satisfying the threshold, the entry from the table of currently active IP traffic flows.

11. The device of claim 7, wherein the one or more processors, when updating the ARP packet filter, are to:
   determine that an entry associated with an IP traffic flow has been removed from the table of currently active IP traffic flows; and
   remove a media access control (MAC) address associated with the entry from the ARP packet filter.

12. The device of claim 7, wherein the one or more processors, when updating the ARP table based on the IP keepalive response message, are to:
   update an expiration time associated with the item in the ARP table based on the IP keepalive response message.

13. The device of claim 7, wherein the IP keepalive response message includes updated information concerning an IP address or a media access control (MAC) address associated with the different device,
   wherein the one or more processors, when updating the ARP table based on the IP keepalive response message, are to:
      update an IP address or a MAC address included in an entry associated with the different device in the ARP table based on the updated information.

14. A non-transitory computer-readable medium storing instructions, the instructions comprising:
   one or more instructions that, when executed by one or more processors of a device, cause the one or more processors to:
      receive one or more initial address resolution protocol (ARP) packets from one or more additional devices;
      update an ARP table based on the one or more initial ARP packets;
      determine internet protocol (IP) traffic monitoring criteria;
      monitor IP traffic based on the IP traffic monitoring criteria;
      update, based on monitoring the IP traffic, one or more entries in a table of currently active IP traffic flows;
      update, based on updating the one or more entries in the table of currently active IP traffic flows, one or more corresponding addresses in an ARP packet filter;
      receive one or more ARP packets, from a different device,
         wherein a quantity of the one or more ARP packets is greater than a quantity of packets that the device is capable of processing during a period of time;
      determine, during the period of time, whether to accept or discard the one or more ARP packets based on an address or processing information associated the one or more ARP packets and an acceptable address or acceptable processing information associated with the ARP packet filter; and
      cause the ARP table to be updated based on determining whether to accept or discard the one or more ARP packets.

15. The non-transitory computer-readable medium of claim 14, wherein the one or more instructions, that cause the one or more processors to determine whether to accept or discard the one or more ARP packets based on the ARP packet filter, cause the one or more processors to:
   determine, based on the one or more corresponding addresses in the ARP packet filter, a bandwidth requirement; and
   determine that accepting the one or more ARP packets would not exceed the bandwidth requirement.

16. The non-transitory computer-readable medium of claim 14, wherein the one or more instructions, that cause the one or more processors to update the one or more corresponding addresses in the ARP packet filter based on updating the one or more entries in the table of currently active IP traffic flows, cause the one or more processors to:
   determine that a media access control (MAC) address included in an entry associated with an IP traffic flow in the table of currently active IP traffic flows has changed; and
   update the ARP packet filter to include the MAC address that has changed.

17. The non-transitory computer-readable medium of claim 14, wherein the one or more instructions, that cause the one or more processors to update the ARP table based on the one or more initial ARP packets, cause the one or more processors to:
   determine a source media access control (MAC) address associated with at least one ARP packet of the one or more initial ARP packets; and
   update an expiration time included in an entry of the ARP table that is associated with the source MAC address.

18. The non-transitory computer-readable medium of claim 14, wherein the one or more instructions, that cause the one or more processors to cause the ARP table to be updated based on determining whether to accept or discard the one or more ARP packets, cause the one or more processors to:
   update, based on determining to accept the one or more ARP packets, an expiration time associated with an entry of the ARP table that concerns the different device.

19. The non-transitory computer-readable medium of claim 14, wherein the one or more instructions, that cause the one or more processors to cause the ARP table to be updated based on determining whether to accept or discard the one or more ARP packets, cause the one or more processors to:
   determine, based on determining to discard the one or more ARP packets, that an entry of the ARP table that concerns the different device has expired; and
   remove the entry from the ARP table.

20. The non-transitory computer-readable medium of claim 14, wherein the one or more instructions, that cause the one or more processors to cause the ARP table to be updated, cause the one or more processors to:
   determine, based on determining to discard the one or more ARP packets, that an entry of the ARP table that concerns the different device has expired;
   send an IP keepalive request message to the different device;
   receive an IP keepalive response message from the different device; and
   update the ARP table to indicate that the different device has not expired based on receiving the IP keepalive response message.

* * * * *

UNITED STATES PATENT AND TRADEMARK OFFICE
CERTIFICATE OF CORRECTION

| | | |
|---|---|---|
| PATENT NO. | : 11,050,650 B1 | Page 1 of 1 |
| APPLICATION NO. | : 16/421032 | |
| DATED | : June 29, 2021 | |
| INVENTOR(S) | : Shijo Thomas | |

It is certified that error appears in the above-identified patent and that said Letters Patent is hereby corrected as shown below:

In the Claims

In Claim 4, Column 19, Line 56, "more corresponding address in the ARP," should be changed to -- more corresponding addresses in the ARP, --.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*